(12) United States Patent
Hu et al.

(10) Patent No.: US 9,919,450 B2
(45) Date of Patent: Mar. 20, 2018

(54) LOG SPLITTER

(71) Applicant: YTL International Inc., Cerritos, CA (US)

(72) Inventors: SongFu Hu, Cerritos, CA (US); Steve Vanderburgh, Cerritos, CA (US)

(73) Assignee: YTL International Inc.I, Cerritos, CA (US)

( * ) Notice: Subject to any disclaimer, the term of this patent is extended or adjusted under 35 U.S.C. 154(b) by 273 days.

(21) Appl. No.: 14/947,225

(22) Filed: Nov. 20, 2015

(65) Prior Publication Data
US 2017/0144326 A1 May 25, 2017

(51) Int. Cl.
*B27L 7/06* (2006.01)
*F16P 3/24* (2006.01)
*B27L 7/00* (2006.01)

(52) U.S. Cl.
CPC ........ *B27L 7/06* (2013.01); *B27L 7/00* (2013.01); *F16P 3/24* (2013.01)

(58) Field of Classification Search
CPC ..................................... B27L 7/00; B27L 7/06
See application file for complete search history.

(56) References Cited

U.S. PATENT DOCUMENTS

| 899,328 | A | 9/1908 | Saeoker |
| 946,705 | A | 1/1910 | Ppwer |
| 1,511,651 | A | 10/1924 | Brake |
| 3,169,616 | A | 2/1965 | Hunsaker |
| 4,116,251 | A | 9/1978 | Graney |
| 4,246,941 | A | 1/1981 | Campbell |
| 4,258,764 | A | 3/1981 | Gerst |
| 4,411,299 | A | 10/1983 | Alcott |
| 4,427,759 | A | 1/1984 | Gruetzmacher et al. |
| 4,572,340 | A | 2/1986 | Pierce |
| 5,323,822 | A | 6/1994 | Janczak |
| 5,921,300 | A | 7/1999 | Smith |
| 7,814,945 | B2 | 10/2010 | Babcock |
| 8,006,725 | B2 | 8/2011 | Majkrzak |
| 8,091,595 | B2 | 1/2012 | Windrich |
| 2013/0000785 | A1 | 1/2013 | Banjo et al. |
| 2015/0151448 | A1 | 6/2015 | Foley et al. |
| 2015/0328798 | A1* | 11/2015 | Miller .............. B27G 21/00 144/195.8 |
| 2017/0008191 | A1* | 1/2017 | Foley .................. B27L 7/06 |

FOREIGN PATENT DOCUMENTS

EP           1852228 B1    5/2011

* cited by examiner

*Primary Examiner* — Matthew G Katcoff
(74) *Attorney, Agent, or Firm* — David J. Pitman; Fulwider Patton LLP

(57) ABSTRACT

A log splitter having an activation lever and a safety lever that defines a pawl configured to engage with a detent associated with the activation lever in an unactivated position so that the activation lever cannot be rotated unless the safety lever is first rotated out of a safety position to remove the pawl from the detent.

9 Claims, 5 Drawing Sheets

LOG SPLITTER

BACKGROUND

This invention is directed to motor operated mechanical log splitters. More specifically, the invention is directed to mechanical log splitters and methods of providing multiple safety features in combination with advantageous drive features.

Log splitters are known in the hardware and forestry industries. Typically, log splitters derive their power from a motor which may be gas driven, or electrically driven. Power from the motor is fed, typically, to a flywheel that will maintain a steady momentum by the splitter, even when it is splitting a hard log. Log splitters include a blade and ram combination, in which a ram forces a log of log against a blade, thereby splitting the log into chunks of manageable size.

One of the problems that arises with such log splitters is that they can be extremely dangerous. A first source of danger is that a workman may accidentally find that a hand or other extremity may become caught in the space between the ram and the blade, with catastrophic results. Some log splitters today have designs that address this problem, by having a structure that compels a user to apply both of his hands to a point behind the cutting portion of the log splitter before the ram and blade are permitted to move toward each other. However, a second source of danger may be found in the fact that the resetting mechanism of some log splitters, which sets the log splitter at its starting or "zero" configuration before cutting a new log, may fail to reset the activation mechanisms of the splitter to their zero condition, with the result that a user may accidentally trigger movement of the ram and blade combination with only one hand while the other hand is in a location exposed to injury. Such failures more likely occur when one of the activation mechanisms is electronically controlled and prone to error by circuit malfunction, and thus the user cannot see with his unaided eye that a failure has occurred; consequently, he may proceed to use the splitter without knowing that a safety mechanism is in fact not operational and is not working to protect his safety.

Therefore, there is a need in the art of log splitters having a primary safety mechanism protecting a user from accidental limb entrapment, for a safety system which provides a visible and tangible confirmation after each log is split that the safety mechanisms have been reset to their zero configuration and will provide the protection for which they have been designed. The present invention addresses these and other needs.

SUMMARY OF THE INVENTION

In embodiments, the invention is a log splitter of a kind that includes a flywheel for receiving rotational energy from a motor; a sliding ram for applying a force to split wood; a rack gear attached to the sliding ram; a pinion gear having a longitudinal rotation axis and being engageable with the rack gear to drive the rack gear. The log splitter further comprises an activation lever, configured to be rotatable about the axis of the pinion gear from an unactivated position to an activated position. Under this configuration, the activation lever is connected to a cylindrical element defining a detent. The activation lever is connected to a pin that is configured to slide within a slot, the slot being angled to the axis of the pinion gear to include a directional component that is parallel to the axis of the pinion gear. The pin is operably connected to a first cog, the first cog being in permanent rotational engagement with the pinion gear and is configured to be rotationally engageable with a second cog that is in permanent rotational engagement with the flywheel. When the activation lever is rotated from the unactivated position to the activated position, the pin is moved axially to engage the first cog with the second cog. This movement operably engages the flywheel with the rack gear which moves the rack gear in a distal direction. A safety lever that defines a pawl is provided. This is biased, in a safety position, to engage the pawl with the detent when the activation lever is in the unactivated position so that the activation lever cannot be rotated unless the safety lever is first rotated out of the safety position to remove the pawl from the detent. A block operably connected to the rack gear is provided. Further, a rocker arm having a first end and a second end is provided, and is pinned for rotation at a point between the first end and the second end. The block is aligned so that, when the rack gear moves distally, the block also moves distally to push the first end of the rocker arm distally and thus to push the second end of the rocker arm proximally. The second end is aligned in relation to the activation lever so that the second end, when moved proximally, moves the activation lever to the unactivated position thereby aligning the detent with the pawl to allow the safety lever to assume the safety position, and also thereby moving the pin axially to disengage the first cog from the second cog to disengage the flywheel from the rack gear.

In some embodiments, the first cog is co-axial with the axis of the pinion gear. In further embodiments, the second cog is co-axial with the axis of the pinion gear. In yet further embodiments, the block is welded to the rack gear. And in other embodiments, the rocker arm includes a first arm extending perpendicular to the first end of the rocker arm. In other embodiments, the rocker arm includes a second arm extending perpendicular to the second end of the rocker arm. In yet other embodiments, the flywheel and the pinion gear are rotationally engaged with each other via a chain. In further embodiments, the pawl is biased by a spring. In yet further embodiments, the rocker arm is positioned in relation to the block so that the block comes into contact with the rocker arm only when the rack has moved to a limit of distal travel. In additional embodiments, the slot is cut into a cylinder configured to surround the pinion gear.

These and other advantages will become further apparent when the specification is read in conjunction with the drawings and the detailed description of some embodiments.

BRIEF DESCRIPTION OF THE DRAWINGS

FIG. 4 is seen from an opposite side of the pinion gear that is seen in FIGS. 2 and 3, so that a counterclockwise rotation of the activation lever 28 in FIGS. 2 and 3 will be seen as a clockwise rotation of the activation lever in FIG. 4.

DETAILED DESCRIPTION OF SOME EMBODIMENTS

Figure 1:
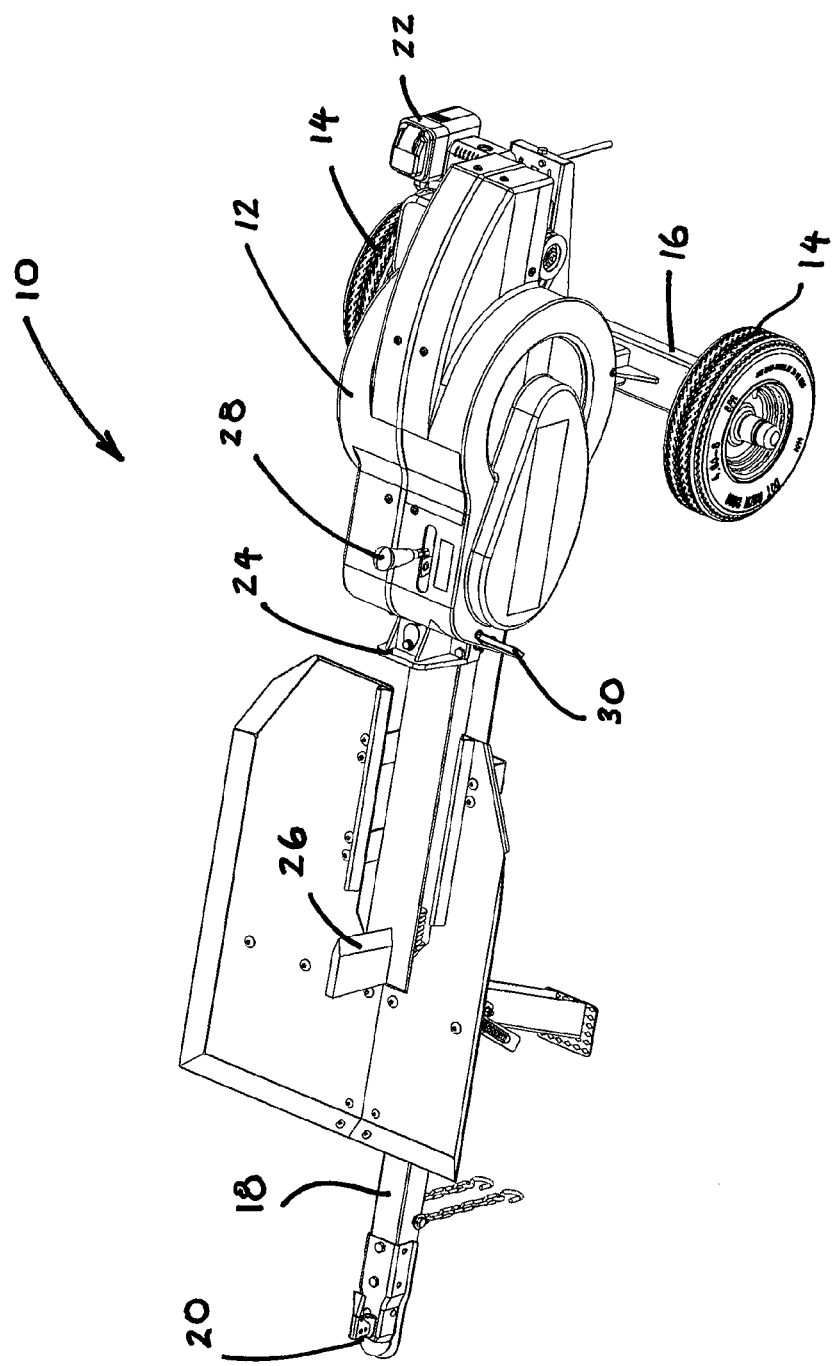
FIG. 1 is a perspective view of a log splitter having features of the present invention.

In some embodiments, as seen with reference to the figures, a log splitter 10 of the present invention comprises a housing 12 mounted on a pair of wheels 14 joined by an axle 16. A central beam 18 extends from the axle 16 to a tow hook connector 20 to enable the assembly to be towed behind a vehicle. Mounted adjacent the housing 12 is a motor 22 which is configured to drive the splitter. A splitting mechanism is protected within the housing 12, and is configured to extend a ram 24 across an open space towards a blade 26. A log of wood (not shown) placed in the open space will be sliced by the blade 26 when the ram 24 forces the log onto the blade.

Figure 2:
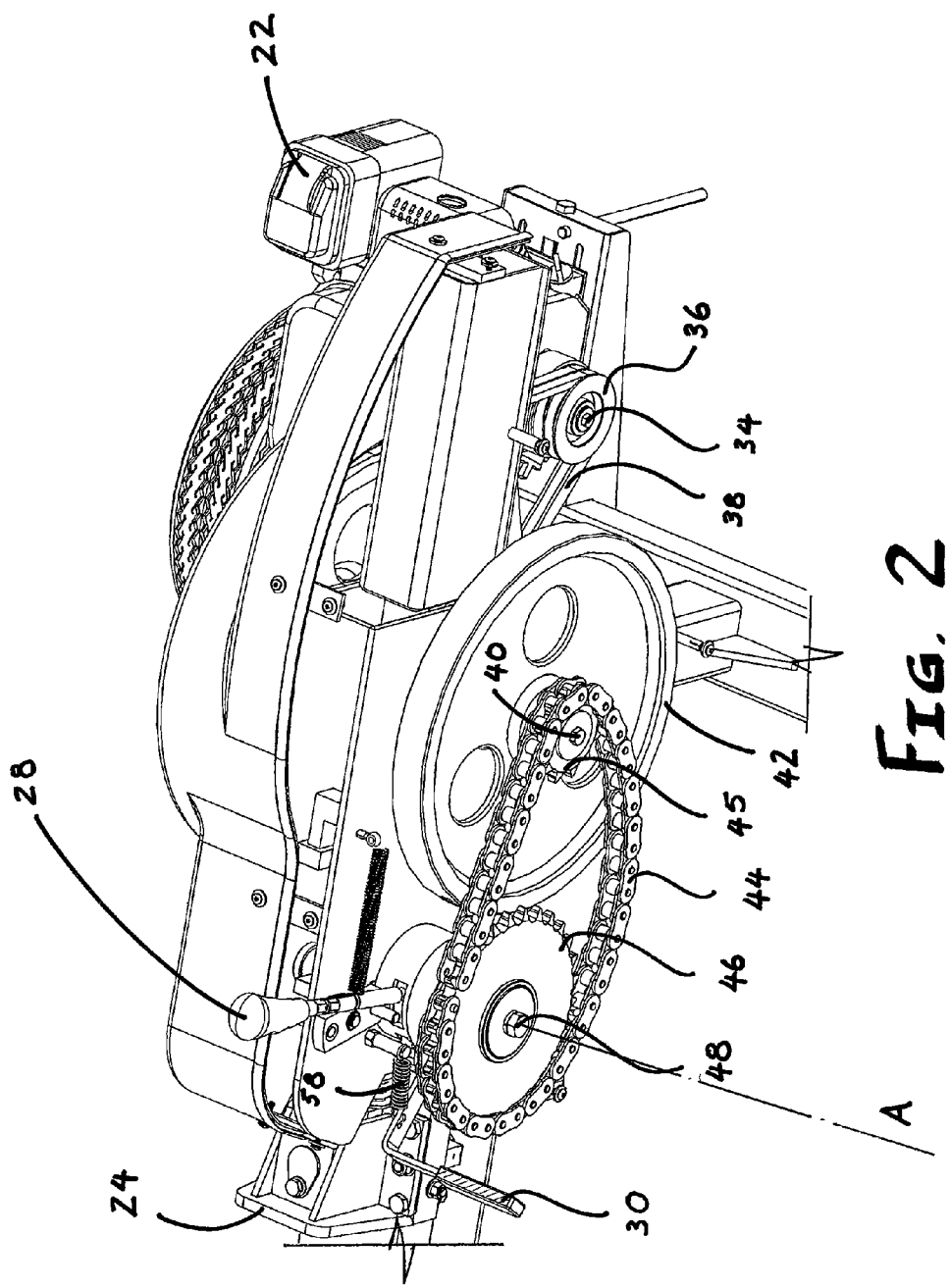
FIG. 2 is an enlarged view showing details of components of the log splitter shown in FIG. 1.

With reference to FIG. 2, providing power for moving the ram 24, the motor 22 drives a shaft 34 affixed to a pulley 36 which in turn drives a belt 38. The belt 38 drives a further shaft 40 carrying a flywheel 42 to maintain angular momentum of the drive system. The shaft 40 drives a chain 44 via a first sprocket 45, which in turn drives a second sprocket 46, which in turn drives a toothed pinion 48. The toothed pinion has an elongate axis marked as A-A in the figures, and it engages with a rack 50 (not seen in FIG. 2, best seen FIGS. 3 and 5). The rack 50 is mounted to the ram 24 so that the rack and the ram move in unison.

In order to control the extension of the ram 24 out of the housing 12, two hand operated levers are provided, and will be described herein at greater length.

An activation lever 28 is provided, and movement of this lever in a distal direction will engage a drive pinion 48 with a rack 50 fixed onto the ram 24. (The term "distal" is the opposite end of the splitter towards the end having the tow hook connector 20, and the term "proximal" refers to the end of the splitter that includes the motor 22.) However, as a safety precaution which forms an aspect of the invention, activation lever 28 cannot be moved distally, unless safety lever 30 is simultaneously moved distally (i.e. counter-clockwise in each case, as viewed in FIG. 3, and clockwise in each case as viewed in FIG. 4).

Figure 3:
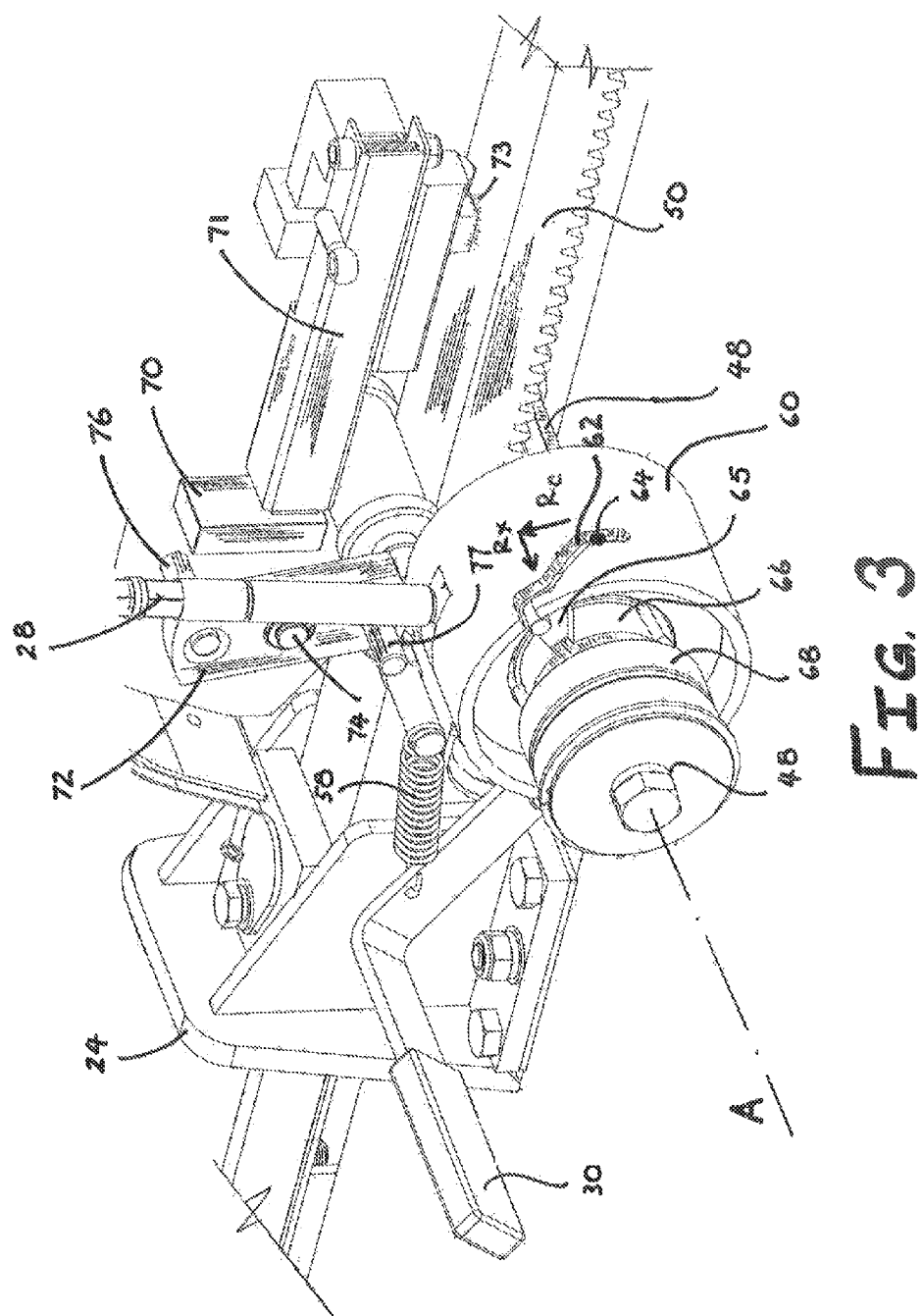
FIG. 3 is a further enlarged view showing details of components of the log splitter shown in FIG. 1.
Figure 4:
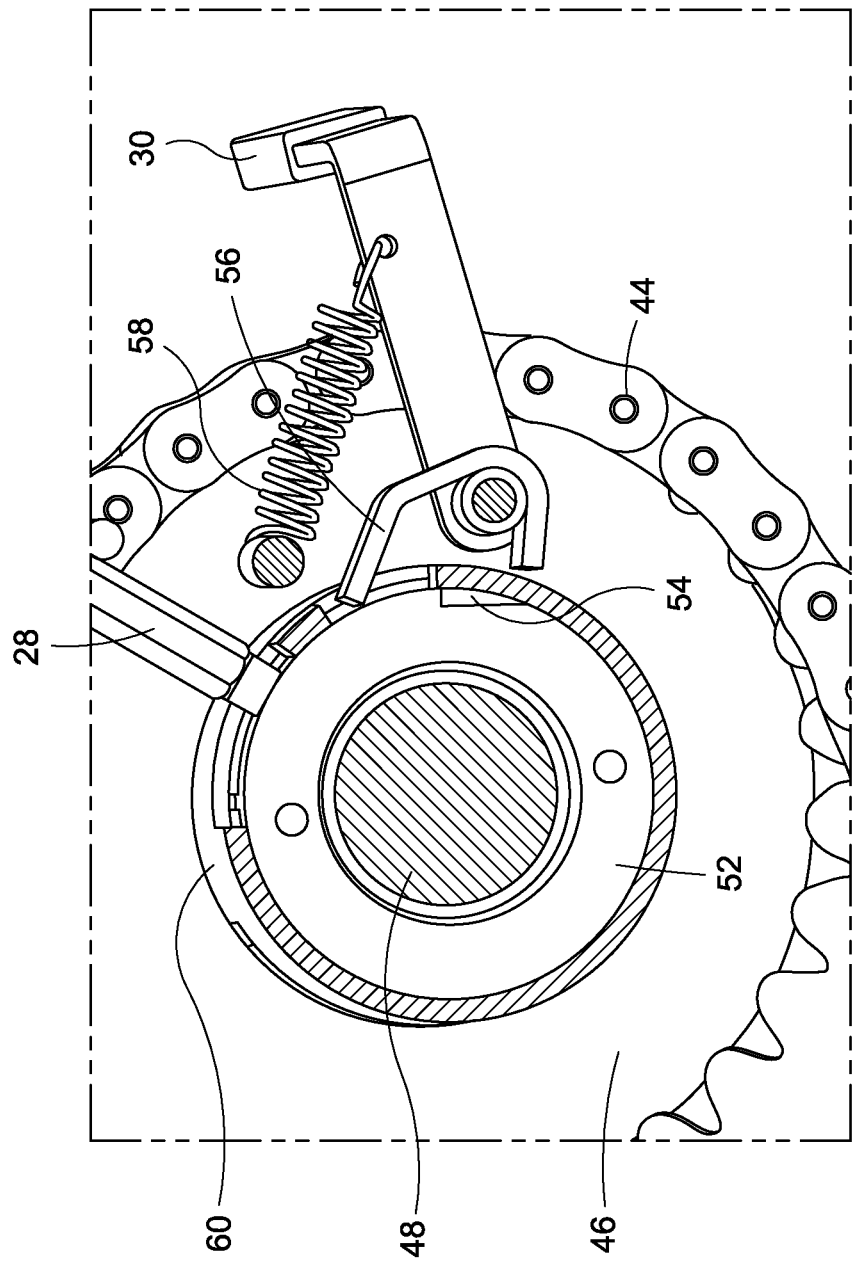
FIG. 4 is a sectional view through the pinion gear 48, showing details of components of the log splitter shown in FIG. 1.

FIG. 4 is a sectional view through the pinion gear 48, showing details of components of the log splitter shown in FIG. 1. FIG. 4 is seen from an opposite side of the pinion gear 48 that is seen in FIGS. 2 and 3, so that a counter-clockwise rotation of the activation lever 28 as seen in FIGS. 2 and 3 will be seen as a clockwise rotation in FIG. 4. With reference to FIG. 4, the activation lever 28 is connected to a flange 52 that rotates about the axis of the pinion 48. The flange 52 defines a cutout 54, which is designed to act as a negative detent. When the activation lever 28 is in its unactivated position, the cutout 54 falls under a pawl 56 connected to the safety lever 30 which is biased by a spring 58 so that the pawl falls into the cutout and prevents the flange 52 from rotating clockwise when the activation lever is in the unactivated position. (The unactivated position is not shown in FIG. 4) However, if the safety lever 30 is rotated clockwise (as is depicted in FIG. 4), the pawl 56 is lifted out of the cutout 54, thereby permitting the flange 52 and the connected activation lever 28 to rotate clockwise to the activated position, as is seen in FIG. 4. As will be explained further below, such movement of the activation lever 28 to the activated position causes rotational engagement between the flywheel 42 and the pinion gear 48, to drive the rack 50 distally and split a log located in front of the ram 24.

This combination of levers 28, 30, and the rotational dependence of the activation leave on the rotation of the safety lever, means that an operator cannot activate the ram 24 of the splitter 10 unless both of his hands are simultaneously placed on the two levers. This feature compels the operator to stand proximally behind the ram 24, and to place both of his hands behind the ram, before the ram can be activated in motion.

Figure 5:
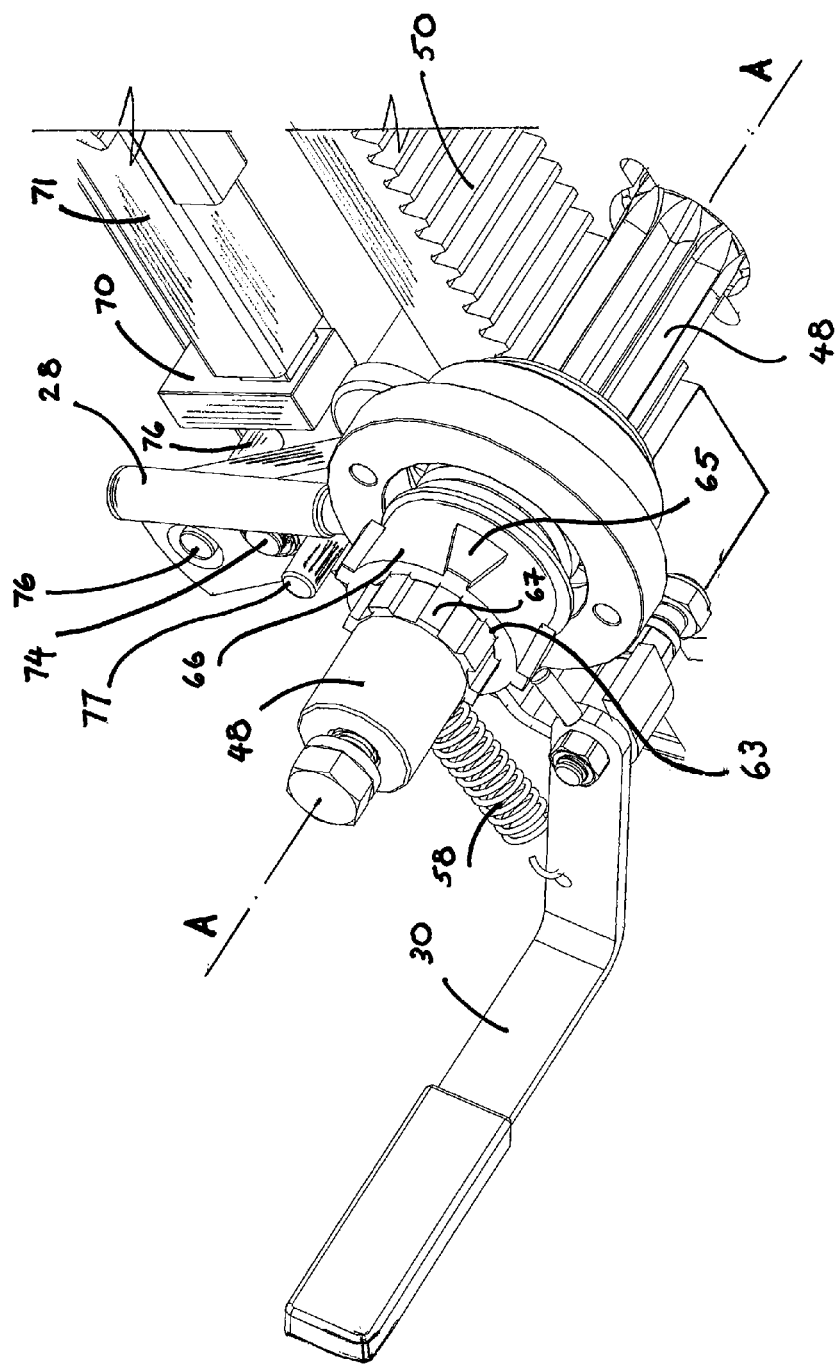
FIG. 5 is yet another enlarged view showing details of components of the log splitter shown in FIG. 1.

With reference to FIGS. 3-5, the mechanism by which the activation lever 28 engages the ram 24 to extend distally and split a log is explained as follows: A cylindrical cover 60 covers the pinion 48 and the flange 52. A specially shaped slot 62 is cut into the cover 60. The special shape of the slot 62 resides in the fact that it has a slope that is formed by having a component that extends simultaneously both circumferentially (with a vector component Rc as seen in FIG. 3), and axially (with a vector component Rx as seen in FIG. 3). A pin 64 is operably connected with the flange 52, so that the pin slides in the slot 62 as the lever 28 is rotated. As can be understood by viewing FIG. 3, because of the angled form of the slot 62, the pin 64 is forced to adopt a component of motion in a direction parallel to the axis of the pinion 48 (that is, with vector Rx) as the lever is rotated.

This axial movement of the pin 64 is configured to force a set of laterally extending male teeth 65, mounted on an outside surface of a first cog 66, in an axial direction along the pinion 48. The first cog 66 has internal teeth 63 which are always engaged with external teeth 67 on the pinion gear 48. The male teeth 65 of the cog 66 engage with laterally mounted female teeth (not seen in the figures) on an inside surface of a second cog 68. The second cog 68 is connected to the sprocket 46 (FIG. 2), which, it will be appreciated, is driven by the flywheel 42 whenever the motor 22 is in motion. Thus, by rotating the activation lever 28 distally or anti-clockwise as seen in FIGS. 2 and 3, the pin 64 is caused to rotate anti-clockwise about the pinion 48 and within the slot 62. This movement causes the pin 64 to move with a component along the axis of the pinion, and to move the first cog 66 axially outward (or to the left, as seen in FIGS. 2 and 3) to engage its own male teeth 65 with internal teeth on the second cog 68, the second cog being operably driven by the flywheel 42. Accordingly, anti-clockwise rotation of the activation lever 30 (as seen in FIGS. 2 and 3), engages rotational motion of the flywheel 42 with the pinion 48. Rotation of the pinion 48 engages the rack 50 (seen in FIGS. 3 and 5), and because of the connection between the rack 50 and the ram 24, the ram 24 is forced to move distally.

Thus, there has been described a system for initiating the advance of the ram 24 to split logs of wood. Following now is described a mechanism for causing the advance of the ram to be automatically halted at the end of its travel (i.e., just before it would run into contact with the blade 26), and the ram to be automatically withdrawn to its starting position. In order to accomplish this result, the mechanism includes a sliding block 70 which is configured to slide distally and, alternatingly, proximally in the device. The block 70 is connected to the rack 50 via a mounting 71 which is preferably welded 73 (FIG. 3) to the rack 50. Fixedly mounted on the device is a rocker arm 72 which is configured to rock about a center pin 74. (The component onto which the rocker arm is pinned has been removed for clarity of the figure.) On its upper end, an upper arm 76 extends to the right, so as to lie in the sliding path of the block 70. On its lower end, a lower arm 77 extends to the left, so as to lie in the path of the activation lever 28.

In operation, as understood in relation to FIG. 3, when the rack is being driven by the pinion 48, the block 70 travels with the rack 50 distally until the rack approaches the end of its travel, and the ram 24 is on the point of reaching the blade 26. At this point, the block 70 is positioned to contact the upper arm 76 and to move it distally. This movement causes the lower arm 77 to move proximally, and this movement brings the lower arm 77 into contact with the activation lever 28, and continues to move the activation lever proximally, as may be envisaged with respect to FIG. 3. Moving the activation lever proximally (or clockwise as seen in FIG. 3) to its unactivated condition has the effect of moving the pin 64 downwards in the slot 62, and this moves the first cog 66 out of engagement with second cog 68. Thus, the drive provided by the flywheel 42 is disengaged from the pinion 48, which ceases to drive the rack 50. A spring (not shown in the figures) which was extended as the ram 24 was moved distally, immediately withdraws the rack 50 proximally back to its starting position, and hence the ram 24 is also withdrawn back to its starting position. The ram is in position to be activated all over again by movement of the activation lever 28 and the safety lever 30. Importantly, when the activation lever 28 is restored to its unactivated position, the detent cutout 54 is rotated to fall under the pawl 56. In this position, the spring 58 biases the safety lever 30 to rotate to its zero position (that is, its position before a log may be split) with the pawl 56 nested in the detent 56. This restoration of the safety lever 30 to its zero position after each log is split is an important feature of the invention, because the user will immediately see—both by visible means, and by the tactile "touch and feel" of the position of the lever—if the safety lever has not been restored to its zero position. Should the user sense that the safety lever is not returning to its zero position, he will immediately know that he is not being protected by the safety mechanism that the safety lever was designed to provide, and may take steps to investigate the mechanical error.

Thus it will be appreciated, the described mechanism has a plurality of safety features. First, it requires two hands to be applied to a location behind the cutting zone for the ram 24 can be activated; second, when the ram 24 reaches a point just before contact with the blade 26, the rotational drive provided by the flywheel 42 to the ram 50 is automatically disengaged, and the ram 24 is automatically withdrawn to its starting position; third, before the user commences on the next log, the location of the safety lever gives him both visible and tactile warning as to whether the first safety feature has been reset to its zero position under which the first safety feature is functioning as intended. The device is in condition for a new log to be inserted in the space between the ram 24 and the blade 26, and the ram may be activated by rotating both the activation lever 28 and the safety lever 30.

Thus, there has been described a novel and useful system for splitting wood that provides novel and advantageous features including multiple safety features. The present invention may, of course, be carried out in other specific ways than those herein set forth without departing from the essential characteristics of the invention. The present embodiments are, therefore, to be considered in all respects as illustrative and not restrictive, while the scope of the invention is set forth in the claims that follow.

We claim:

1. A log splitter comprising:
    a flywheel for receiving rotational energy from a motor;
    a sliding ram for applying a force to split wood;
    a rack gear attached to the sliding ram;
    a pinion gear having a longitudinal axis and being engageable with the rack gear to drive the rack gear;
    an activation lever, configured to rotate about the axis of the pinion gear from an unactivated position to an activated position, wherein:
    the activation lever is connected to a cylindrical element defining a detent;
    the activation lever is connected to a pin that is configured to slide within a slot, the slot being angled to the axis of the pinion gear to include a directional component that is parallel to the axis of the pinion gear;
    wherein, the pin is operably connected to a first cog, the first cog being in permanent rotational engagement with the pinion gear and being configured to be rotationally engageable with a second cog that is in permanent rotational engagement with the flywheel;
    whereby, when the activation lever is rotated from the unactivated position to the activated position, the pin is moved axially to engage the first cog with the second cog, thereby to rotationally engage the flywheel with the rack gear and to move the rack gear in a distal direction;
    a safety lever that defines a pawl and being biased, in a safety position, to engage the pawl with the detent when the activation lever is in the unactivated position so that the activation lever cannot be rotated unless the safety lever is first rotated out of the safety position to remove the pawl from the detent;
    a block operably connected to the rack gear;
    a rocker arm having a first end and a second end and being configured to rock about a fixed pin located between the first end and the second end;
    wherein:
    the block is aligned so that, when the rack gear moves distally, the block also moves distally to push the first end of the rocker arm distally and thus the second end of the rocker arm proximally; and
    the second end is aligned in relation to the activation lever so that the second end, when moved proximally, moves the activation lever to the unactivated position thereby aligning the detent with the pawl to allow the safety lever to assume the safety position, and also thereby moving the pin axially to disengage the first cog from the second cog to disengage the flywheel from the rack gear.

2. The log splitter of claim 1, wherein the first cog is co-axial with the axis of the pinion gear.

3. The log splitter of claim 1, wherein the second cog is co-axial with the axis of the pinion gear.

4. The log splitter of claim 1, wherein the block is welded to the rack gear.

5. The log splitter of claim 1, wherein a first arm is attached to the first end of the rocker arm and extends perpendicular to the first end of the rocker arm.

6. The log splitter of claim 5, wherein a second arm is attached to the second end of the rocker arm and extends perpendicular to the second end of the rocker arm.

7. The log splitter of claim 1, wherein the flywheel and the pinion gear are rotationally engaged with each other via a chain.

8. The log splitter of claim 1, wherein the pawl is biased by a spring.

9. The log splitter of claim 1, wherein the slot is cut into a cylinder configured to surround the pinion gear.

* * * * *